United States Patent
Kanamori

(10) Patent No.: US 9,653,988 B2
(45) Date of Patent: May 16, 2017

(54) APPARATUS AND SYSTEM FOR NOISE CANCELLATION OF POWER CONVERTERS

(71) Applicant: Takashi Kanamori, San Jose, CA (US)

(72) Inventor: Takashi Kanamori, San Jose, CA (US)

(*) Notice: Subject to any disclaimer, the term of this patent is extended or adjusted under 35 U.S.C. 154(b) by 0 days.

(21) Appl. No.: 14/953,067

(22) Filed: Nov. 27, 2015

(65) Prior Publication Data

US 2016/0079847 A1 Mar. 17, 2016

Related U.S. Application Data

(63) Continuation of application No. 14/076,944, filed on Nov. 11, 2013, now Pat. No. 9,214,857.

(51) Int. Cl.
*H02M 1/44* (2007.01)
*H02M 3/156* (2006.01)
*H02M 3/158* (2006.01)

(52) U.S. Cl.
CPC ............ *H02M 1/44* (2013.01); *H02M 3/156* (2013.01); *H02M 3/158* (2013.01)

(58) Field of Classification Search
CPC ......... H02M 1/44; H02M 3/156; H02M 3/158
See application file for complete search history.

(56) References Cited

U.S. PATENT DOCUMENTS

| | | | | |
|---|---|---|---|---|
| 7,242,169 B2* | 7/2007 | Kanamori | ............ | H02M 3/157 323/222 |
| 7,873,854 B2* | 1/2011 | Westwick | ............ | H03K 17/22 713/300 |
| 8,116,104 B2* | 2/2012 | Lee | ............ | H02M 1/44 363/39 |
| 2008/0136353 A1* | 6/2008 | Hsu | ............ | G09G 3/3406 315/307 |
| 2008/0272741 A1* | 11/2008 | Kanamori | ............ | G06F 1/266 320/137 |

* cited by examiner

*Primary Examiner* — Michael Zarroli
(74) *Attorney, Agent, or Firm* — Ariel S. Bentolila; Bay Area IP Group LLC

(57) ABSTRACT

A system having a noise cancellation converter being configured for phase inverted synchronous operation with a primary converter. The primary converter is operable to supply power to at least one device. The primary converter produces a first electromagnetic interference during operation. The noise cancellation converter is further configured with parasitic components matching parasitic components of the primary converter. The noise cancellation converter produces a second electromagnetic interference that is coupleable to the device. The second electromagnetic interference comprises frequency components having an inverted phase relative to frequency components of the first electromagnetic interference for reducing a sum of the first electromagnetic interference and the second electromagnetic interference during coupling to the device. An RC network component is configured to operatively connect the primary converter and the noise cancellation converter being operable to cancel out the sum of the electro-magnetic interference signals.

9 Claims, 13 Drawing Sheets

APPARATUS AND SYSTEM FOR NOISE CANCELLATION OF POWER CONVERTERS

CROSS-REFERENCE TO RELATED APPLICATIONS

The present continuation patent application claims priority benefit under 35 U.S.C. 120 of the U.S. non-provisional patent application Ser. No. 14/076,944 entitled "An Apparatus and System for Noise Cancellation of Power Converters" filed on 11 Nov. 2013. The contents of this related patent application is incorporated herein by reference for all purposes to the extent that such subject matter is not inconsistent herewith or limiting hereof.

RELATED CO-PENDING U.S. PATENT APPLICATIONS

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to methods of cancellation of electro-magnetic noise. More particularly, the invention relates to methods of cancellation of electro-magnetic noise of switching regulators.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that industrial and consumer electronic devices are known to be powered by battery, direct current (DC), alternating current (AC) or combinations thereof. Whether battery, DC or AC powered the voltage of the power source must often be converted from one voltage to another voltage before it is delivered to an electronic element. An electronic element, in an electronic device, is conventionally referred to as a "load". A load in an electronic device may be a CPU, a memory device, a hard disk, an ASIC (application specific integrated circuit), and so forth. Each load requires a specific voltage to operate. The apparatus that converts one voltage to another is typically called a "converter" or a "power converter". A converter that raises one voltage to another voltage is typically called a "boost converter", and a converter that reduces one voltage to another voltage is typically called a "buck converter". A common type of converter used to convert one voltage to another voltage is a switching power converter (a switching power converter may also be referred to as a switching power supply or a switch mode power supply). Conventionally, a switching power converter will incorporate a switching regulator, and switching regulator circuit, when converting one voltage to another voltage.

The following is another example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is shown in FIG. 1. FIG. 1 illustrates a schematic of an exemplary prior art buck topology switching regulator circuit as may be used in a switching power converter. The buck switching regulator circuit is usually comprised of a switch 100, a diode 110 and a filter, which further may be comprised of an inductor 120 and a capacitor 130. Switch 100 may be a FET, MOSFET, BJT, IGBT or other suitable electronic switching device. During typical operation of the buck switching regulator circuit the switch 100 alternates its state between the on-state and the off-state. As a result, a square wave (FIG. 1) is generated on the switching node 140 of the buck switching regulator circuit. The square wave is then typically rectified by a rectifier or an LC filter (FIG. 1). The diode 110 allows the current to continue to flow through the inductor 120 while the switch 100 alternates between the on-state and the off-state. The output voltage Vo of the buck switching regulator circuit is a function of the duty cycle D (FIG. 1) of the switch 100. Typically, in a buck switching regulator circuit, the time averaged voltage (Vin*D) on the switching node 140 is the same as the output voltage Vo (Vo=Vin*D). The maximum voltage of the square wave is the same as the input voltage Vin because the switch is connected to the input voltage Vin.

The following is yet another example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is shown in FIG. 2. FIG. 2 illustrates a schematic of an exemplary prior art boost topology switching regulator circuit as may be used in a switching power converter. The boost switching regulator circuit is typically comprised of a switch 200, a diode 210, a filter 220 and a capacitor 230. Switch 200 may be a FET, MOSFET, BJT, IGBT or other suitable electronic switching device. The switch 200 is connected after the filter 220 and the output voltage Vo is rectified through the diode 210 when the switch 200 is in the off-state or when the diode 210 conducts. The output voltage Vo of the boost switching regulator circuit is a function of the duty cycle D (FIG. 2) of the switch 200. Since the filter 220 between the input voltage Vin and the switching node 240 rectifies the square wave into the output voltage Vo with no loss, the time averaged voltage on the switching node is the same as the input voltage Vin (FIG. 2). The height of the square wave is equal to the output voltage Vo in a boost converter, which is equal to Vin/1−D.

A typical switching regulator circuit, examples of which are described in the previous sections, regulates the output voltage Vo by modulating the widths of the pulses (duty cycle) on the switching node. This method is usually referred to as pulse width modulation (PWM). The voltage on the switching node changes from 0 to Vin, and Vin to 0, in case of a buck switching regulator, and from 0 to Vo, and Vo to 0, in case of a boost switching regulator, in a short period of time (typically within a few nano-seconds).

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that it is well known that, in addition to the buck and boost switching regulator circuit topologies described in the previous sections, various other switching regulator circuit topologies exist in the art and include, by way of example and without limitation, polarity inverting, push-pull, forward converter, half-bridge, full-bridge, flyback, CUK, SEPIC, synchronous, asynchronous, isolated and non-isolated topologies, which may be operating in continuous mode, discontinuous mode, interleaved mode, current mode, voltage mode, voltage fed mode, current fed mode or other modes or combinations thereof as is known in the art.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that it is well known, and described by Faraday's law, that a time varying electromagnetic field induces a counter electromagnetic field which cancels out the original electromagnetic field. The counter electromagnetic field energy is induced and released as electromagnetic noise into the conductor or radiated into the space in the vicinity of the switching node. The electromagnetic energy, or noise, that travels through a conductor is called conducted noise, and the electromagnetic energy or noise that travels through space is called radiated noise. Often these two are differentiated by their frequency bands.

This conducted and radiated electromagnetic noise is often referred to as electromagnetic interference (EMI) and EMI may interfere with operation of electronic devices. EMI may obstruct, interrupt, or degrade the performance of memory devices, CPUs, and application specific integrated circuits (ASIC)'s, for example, on a computing processor board. EMI may also cause audio circuit degradation. Listeners of audio devices may hear audible EMI noise induced by switching regulators used within the audio devices.

Although switching regulators are known to cause EMI, they are frequently used in electronic devices because of their high power conversion efficiencies, low power losses and compact size.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that circuit designer's methods and solutions of addressing switching regulator EMI have typically been passive methods such as installing electrical component filters in noise-susceptible areas or mechanically shielding switching regulators or noise-susceptible electrical devices with metallic nets. Both passive component EMI filtering and metallic net EMI shielding may require bulky and/or costly electrical and mechanical components to be added to a typical electrical device.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
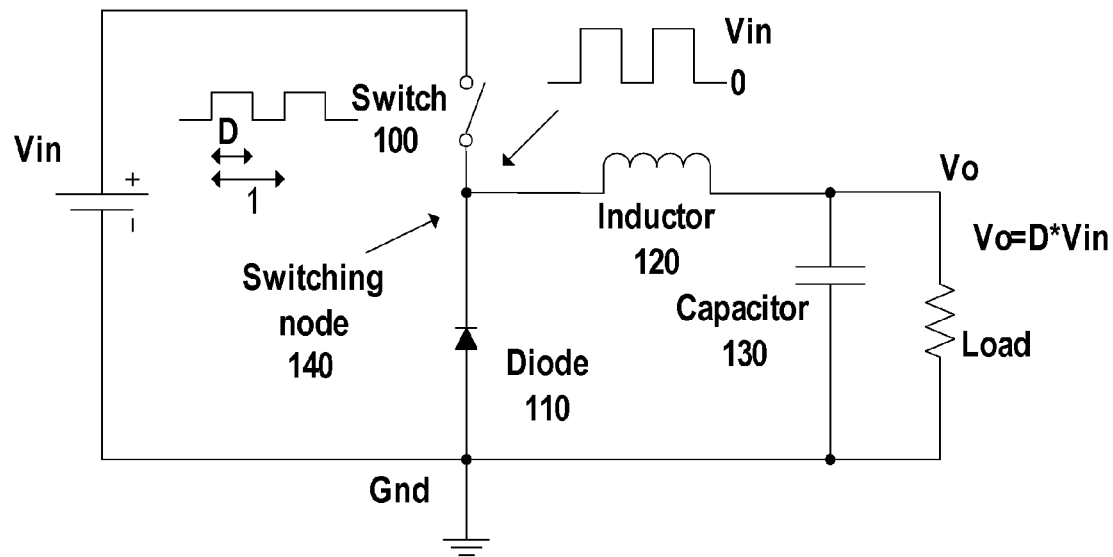
FIG. 1 illustrates a schematic of an exemplary prior art buck topology switching regulator circuit as may be used in a switching power converter.
Figure 2:
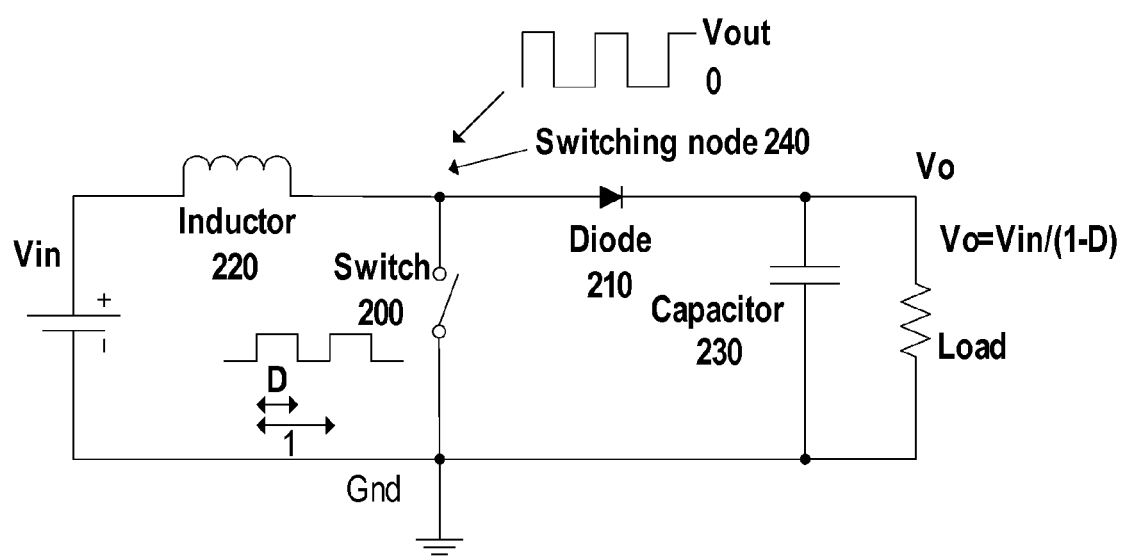
FIG. 2 illustrates a schematic of an exemplary prior art boost topology switching regulator circuit as may be used in a switching power converter.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Figure 3:
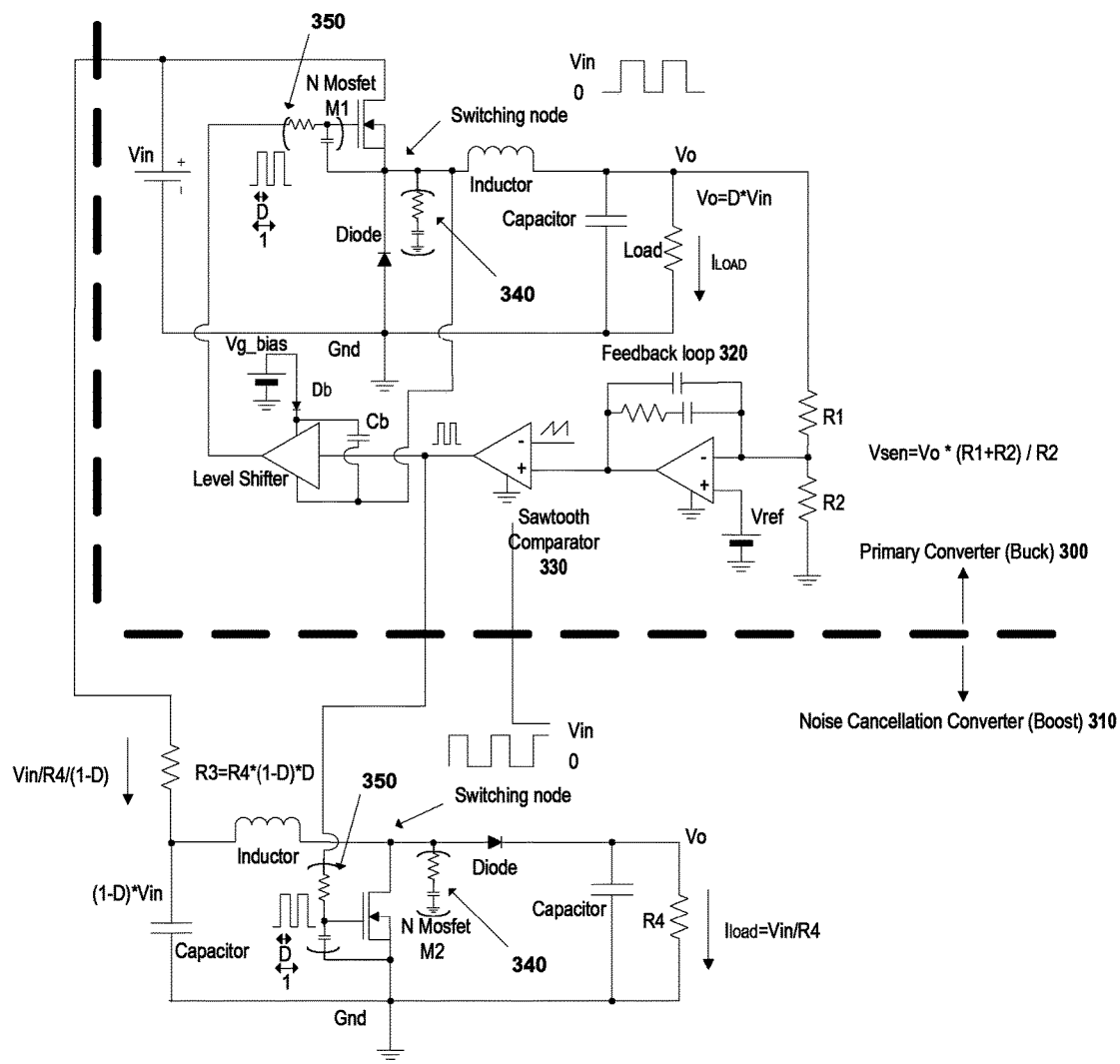
FIG. 3 illustrates a schematic of an exemplary buck topology primary converter and a boost topology noise cancellation converter, in accordance with an embodiment of the present invention.

FIG. 3 illustrates a schematic of an exemplary buck topology primary converter and a boost topology noise cancellation converter, in accordance with an embodiment of the present invention. Primary converter 300 comprises a buck converter circuit and delivers power to a load. Noise cancellation converter 310 comprises a boost converter circuit. Typically, the noise cancellation converter 310 is located in close physical proximity to the primary converter 300. Optionally, as a non-limiting example, the noise cancellation converter 310 and the primary converter 300 may be implemented on a common printed circuit assembly substrate, on a common integrated circuit substrate, or equivalent thereof.

Further, the primary converter 300 comprises a voltage feedback loop 320 circuit comprised of an opamp and an RC network. Voltage feedback loop 320 compares a sensed voltage Vsen with a reference voltage Vref and provides an input signal, which is a function of Vsen and Vref, to a sawtooth comparator 330 circuit.

Sawtooth comparator 330 compares the input signal with a sawtooth waveform and forms a pulse width modulation (PWM) signal. The PWM signal is provided to an input of a level shifter circuit forming a level shifted PWM signal. Optionally, the PWM signal may be buffered, inverted, filtered or otherwise conditioned by methods known by those with knowledge in the art. The level shifted PWM signal drives the gate of the primary converter 300 MOSFET M1 and the PWM signal drives the gate of the noise cancellation converter 310 MOSFET M2 synchronizing the switching operation of the primary converter 300 and the noise cancellation converter 310.

The switching operation of the primary converter 300 and the noise cancellation converter 310 are synchronized and operate in inverse phase. The switching operation of the primary converter 300 creates a primary electro-magnetic interference (EMI) signal at the switching node of the primary converter 300 and the switching operation of the noise cancellation converter 310 creates a noise cancellation EMI signal at the switching node of the noise cancellation converter 310.

The noise cancellation EMI signal is synchronized, in inverse phase and of equivalent amplitude with the primary EMI signal and, as is known by the theorem of superposition, creates a resultant EMI signal which is the algebraic sum of the primary EMI signal and the noise cancellation EMI signal. In many practical implementations, the amplitude of the resultant EMI signal is substantially reduced from the amplitude of the primary EMI signal and the noise cancellation EMI signal.

The primary EMI signal and the noise cancellation EMI signal each include a fundamental component (PWM component) and a high frequency component (ringing or EMI caused by parasitic components). With the primary converter and the noise cancellation converter being in synchronization, a difference in fundamental frequency of the EMI signals does not exist. Optionally, the parasitic impedances of the primary converter 300 and the noise cancellation converter 310 may be closely matched, using methods known to those with knowledge in the art, to further improve the reduction of the amplitude of the resultant EMI signal. The EMI frequency may be calculated by $1/(2*pi*sqrt(Lemi*Cemi))$ for parasitic components Lemi and Cemi. In a non-limiting example, if a 10% mismatch in the high frequency components is to be tolerated, parasitic components Lemi*Cemi may as much as a 20% tolerance in matching, since $1/sqrt(1.2)=109.5\%$ or $1/sqrt(0.8)=89.4\%$. This is well within the reach of semiconductor process control technique.

In the present embodiment, the maximum noise cancellation may be if the EMI signals from the two converters match in frequency and in amplitude. As a non-limiting example, if it is considered that the sole purpose of the noise cancellation converter is to produce and emit the EMI signal and the PWM signal with the inverse phase to the primary converter, one may arbitrarily choose the MOSFET M2 and the diode of the noise cancellation converter. The EMI signal frequency can be calculated by $1/(2*pi*sqrt(Lemi*Cemi))$. By using this formula, if one knows the parasitic inductance value and the parasitic capacitance value of the MOSFET M2 and the diode, one may match the EMI signal frequency of the noise cancellation converter and that of the primary converter. Optionally, if a mismatch still occurs between the two converters, a fine adjustment of the EMI signal's frequency or amplitude be possible by placing a snubber circuit 340 (R and C) on the switching node of either or both the primary converter or/and the noise cancellation converter to ground Or, optionally, the drive current for the gate of the MOSFET may be adjusted on either or both the primary converter or/and the noise cancellation converter by coupling an RC network 350 at the gate and adjusting the RC value.

In alternate embodiments, if a phase difference or an amplitude difference of an EMI noise/signal may be monitored, a feedback system may be employed.

In a non-limiting example, the EMI signal frequency is determined by the formula $1/(2*pi*sqrt(Lemi*Cemi))$, where Lemi and Cemi are the parasitic inductance and the parasitic capacitance of the MOSFET and the diode, respectively. A 10% mismatch is tolerated to effectively cancel out the EMI signal. To achieve 10% mismatch in frequency, 20% mismatch in Lemi*Cemi is tolerated because of the square root. This is within the reach of the today's semiconductor process control technique. The timings of the turn-on and turn-off of the MOSFETs in the primary converter and the noise cancellation converter are determined by the gate threshold voltages of the MOSFETs and the gate driving capabilities (source and sink current of the gate drivers). If a different MOSFET must be used in the noise cancellation converter than in the primary converter, and if it has higher gate threshold voltage, for example, the gate driving capability may be increased to match the turn on timing. However if the same MOSFET is used, or both the primary converter MOSFET and the noise cancellation converter MOSFET reside in the same silicon die, for example, the mismatch of the gate threshold voltages is much smaller. In this case, directly coupling the gate of the primary converter and the gate of the noise cancellation converter with the same gate driving capability will ensure the simultaneous turn-on and the turn-off of the MOSFETs.

Optionally, the amplitude of the noise cancellation EMI signal may be adjusted to further match the amplitude of the primary EMI signal by adjusting the output voltage (Vo) of the noise cancellation converter 310 to match that of Vin of the primary converter 300 establishing a noise cancellation EMI signal at the switching node of the noise cancellation converter 310 with an amplitude matching that of the primary EMI signal at the switching node of the primary converter 300.

Typically the electro-magnetic field that interferes with normal operations of ASICs is an AC component with the frequency range of 100 MHz to 1 GHz (or 1-10 nsec.), whether it is current or voltage. The rate of the change of either the current or the voltage of the PWM converter induces C*dV/dT current that travels from the PWM converter's switching node to the high frequency signal lines (such as differential pairs) of ASICs through the PCB material and/or air. If the rise time and the amplitude of the switching node voltage of the noise cancellation converter match those of the primary converter, but its phase is inverse to the primary converter, C*dV/dT currents cancel out. However to achieve this, the current level of the noise cancellation converter should not be zero. It will have to operate in the continuous conduction mode, yet its current level doesn't have to match that of the primary converter.

Figure 4:
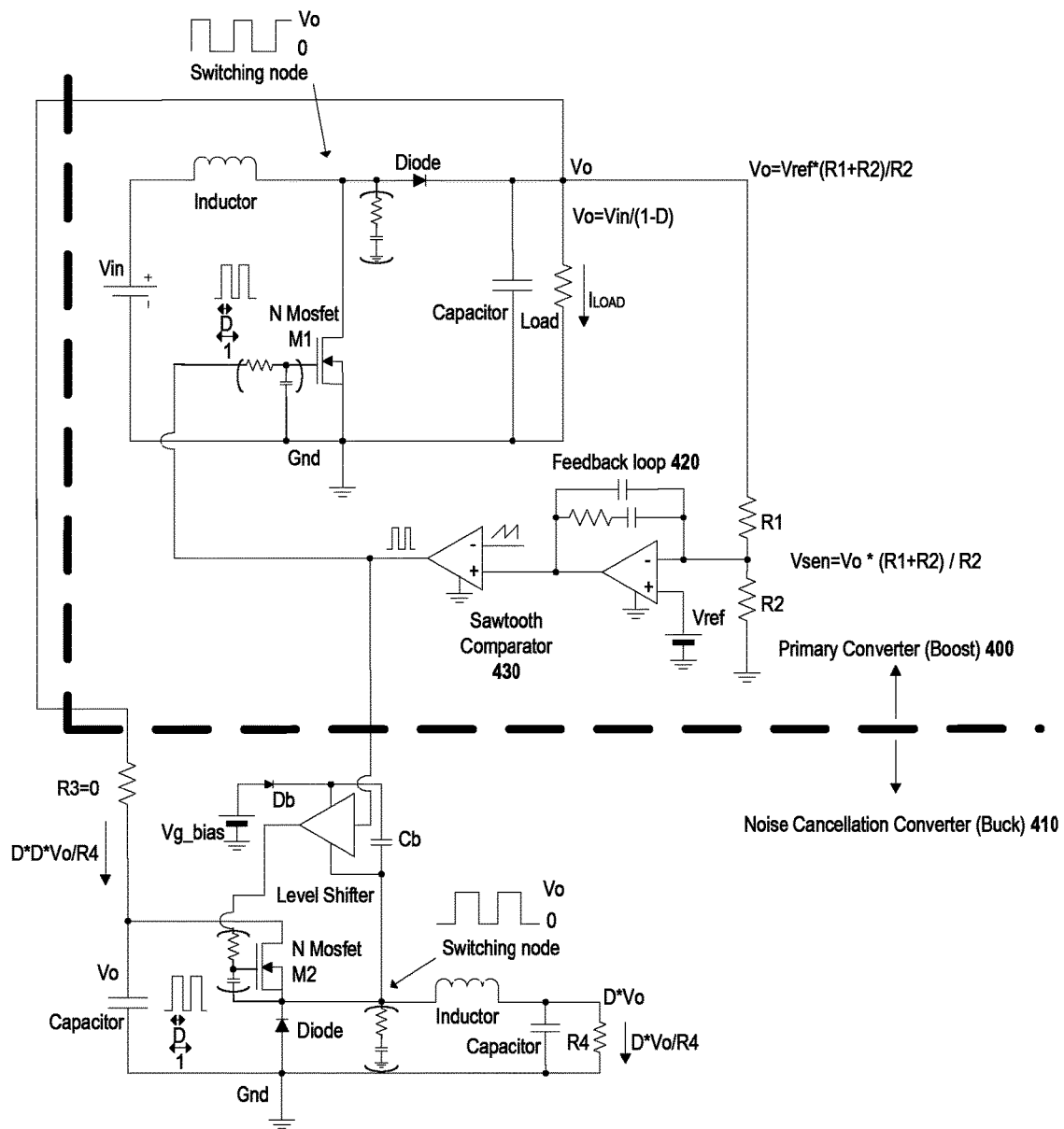
FIG. 4 illustrates a schematic of an exemplary boost topology primary converter and a buck topology noise cancellation converter, in accordance with an embodiment of the present invention.

FIG. 4 illustrates a schematic of an exemplary boost topology primary converter and a buck topology noise cancellation converter, in accordance with an embodiment of the present invention. Primary converter 400 comprises a boost converter circuit and delivers power to a load. Noise cancellation converter 410 comprises a buck converter circuit. Typically, the noise cancellation converter 410 is located in close physical proximity to the primary converter 400.

Optionally, as a non-limiting example, the noise cancellation converter 410 and the primary converter 400 may be implemented on a common printed circuit assembly substrate, on a common integrated circuit substrate, or equivalent thereof. The primary converter and the noise cancellation converter may be perceived as one entity by ASICs, because the strength of the EMI signal traveling through the PCB materials or air is the function of the distance. Thus the distance from the origin of the EMI signal (the primary converter) and the distance from the origin of the counter EMI signal (the noise cancellation converter) should be equal or near-equal. In many embodiments, the switching converters, whether they are implemented discretely or of which switching elements are embedded in a common (separate) mixed signal IC substrate, are laid out so that the switching node of the primary converter and that of the noise cancellation converter are in close proximity. In some embodiments, they are within about a quarter of an inch. If they are separated by the distance more than that, the superposition of the EMI signals is weakened, or has directional or angular de-ratings. In many embodiments, the switching converters, whether they are implemented discretely or of which switching elements (the FET and/or the diode) are embedded in a common (or separate) mixed signal IC substrate, are laid out so that the switching node of the primary converter and that of the noise cancellation converter are in close proximity. In some embodiments, they are within quarter of an inch. In this sense, there is no difference in the behavior of the noise cancellation between the discrete solution and the mixed signal IC solution, as long as the switching nodes of the two converters are separated by shorter than quarter of an inch.

In a non-limiting example, the electro-magnetic field becomes dampened, attenuated or shielded by ground planes, power planes or sheet metals through which it travels. In this respect, both the switching node of the primary converter (the source of the EMI noise) and that of the noise cancellation converter (the source of the counter EMI noise) should be located on the same side of the PCB board, if the noise cancellation is to occur most effectively. The higher the dielectric constant of the packaging/mounting material is, the higher the parasitic capacitance value becomes, as described by the formula, $C=e*A/l$, where C is the capacitance value, e is the dielectric constant, A is the surface area of the electrode, and l is the distance between the two electrodes). Therefore the higher the dielectric constant is, thereby the higher the capacitance value is, the stronger the coupling of the two EMI signals becomes, thereby the stronger the cancellation effect becomes. The strengths of the two electro-magnetic fields measured from ASICs should be equal, therefore a vertical stacked configuration is not preferred due to the inefficient coupling of the two electro-magnetic fields separated by ground layers, power layers, or sheet metals. The switching node of the primary converter and that of the noise cancellation converter should be located on the same side of the PCB.

Further, the primary converter 400 comprises a voltage feedback loop 420 circuit comprised of an opamp and an RC network. Voltage feedback loop 420 compares a sensed voltage Vsen with a reference voltage Vref and provides an input signal, which is a function of Vsen and Vref, to a sawtooth comparator 430 circuit.

Sawtooth comparator 430 compares the input signal with a sawtooth waveform and forms a pulse width modulation (PWM) signal. The PWM signal is input into a level shifter circuit forming a level shifted PWM signal. Optionally, the PWM signal may be buffered, inverted, filtered or otherwise conditioned by methods known to those with knowledge in the art. The PWM signal drives the gate of the primary converter 400 MOSFET M1 and the level shifted PWM signal drives the gate of the noise cancellation converter 410 MOSFET M2 synchronizing the switching operation of the primary converter 400 and the noise cancellation converter 410.

The switching operation of the primary converter 400 and the noise cancellation converter 410 are synchronized and operate in inverse phase. The switching operation of the primary converter 400 creates a primary electro-magnetic interference (EMI) signal at the switching node of the primary converter 400 and the switching operation of the noise cancellation converter 410 creates a noise cancellation EMI signal at the switching node of the noise cancellation converter 410.

The noise cancellation EMI signal is synchronized, in inverse phase and of equivalent amplitude with the primary EMI signal and, as is known by the theorem of superposition, creates a resultant EMI signal which is the algebraic sum of the primary EMI signal and the noise cancellation EMI signal. In many practical implementations, the amplitude of the resultant EMI signal is substantially reduced from the amplitude of the primary EMI signal and the noise cancellation EMI signal.

Optionally, the parasitic impedances of the primary converter 400 and the noise cancellation converter 410 may be closely matched, using methods known to those with knowledge in the art, to further improve the reduction of the amplitude of the resultant EMI signal.

Optionally, the amplitude of the noise cancellation EMI signal may be adjusted to further match the amplitude of the primary EMI signal by adjusting the input voltage (Vin) of the noise cancellation converter 410 to match the output voltage (Vo) of the primary converter 400 establishing a noise cancellation EMI signal at the switching node of the noise cancellation converter 410 with an amplitude matching that of the primary EMI signal at the switching node of the primary converter 400.

Figure 5:
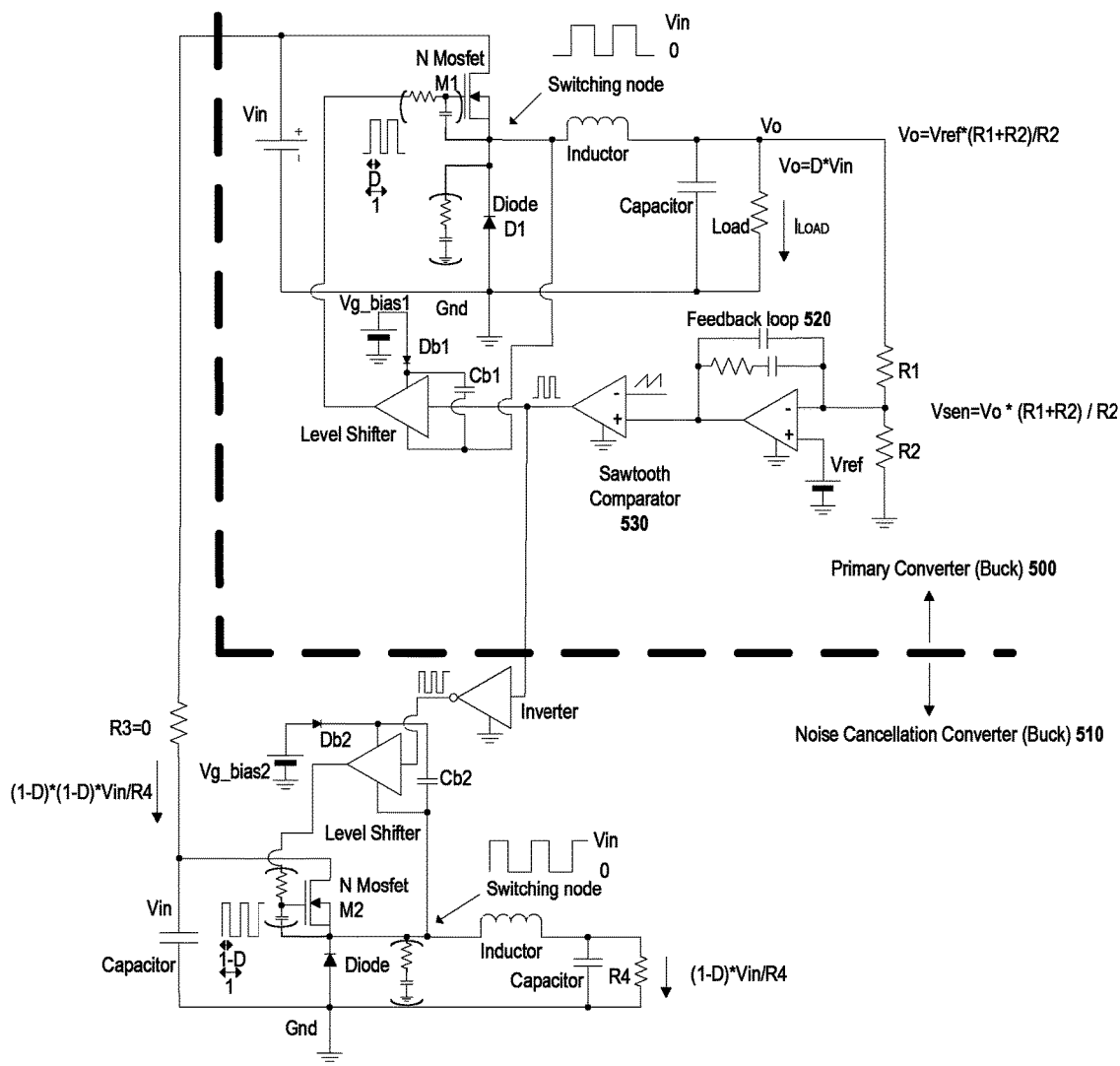
FIG. 5 illustrates a schematic of an exemplary buck topology primary converter and a buck topology noise cancellation converter, in accordance with an embodiment of the present invention.

FIG. 5 illustrates a schematic of an exemplary buck topology primary converter and a buck topology noise cancellation converter, in accordance with an embodiment of the present invention. Primary converter 500 comprises a buck converter circuit and delivers power to a load. Noise cancellation converter 510 comprises a buck converter circuit. Typically, the noise cancellation converter 510 is located in close physical proximity to the primary converter 500. Optionally, as a non-limiting example, the noise cancellation converter 510 and the primary converter 500 may be implemented on a common printed circuit assembly substrate, on a common integrated circuit substrate, or equivalent thereof.

Further, the primary converter 500 comprises a voltage feedback loop 520 circuit comprised of an opamp and an RC network. Voltage feedback loop 520 compares a sensed voltage Vsen with a reference voltage Vref and provides an input signal, which is a function of Vsen and Vref, to a sawtooth comparator 530 circuit.

Sawtooth comparator 530 compares the input signal with a sawtooth waveform and forms a pulse width modulation (PWM) signal. The PWM signal is input into a first level shifter circuit forming a first level shifted PWM signal. Further, the PWM signal is input into an inverter circuit forming an inverted PWM signal. Additionally, the inverted PWM signal is input into a second level shifter circuit forming a level shifted inverted PWM signal. Optionally, the PWM signal may be buffered, filtered or otherwise conditioned by methods known to those with knowledge in the art. The first level shifted PWM signal drives the gate of the primary converter 500 MOSFET M1 and the level shifted inverted PWM signal drives the gate of the noise cancellation converter 510 MOSFET M2 synchronizing the switching operation of the primary converter 500 and the noise cancellation converter 510.

The switching operation of the primary converter 500 and the noise cancellation converter 510 are synchronized and operate in inverse phase. The switching operation of the primary converter 500 creates a primary electro-magnetic interference (EMI) signal at the switching node of the primary converter 500 and the switching operation of the noise cancellation converter 510 creates a noise cancellation EMI signal at the switching node of the noise cancellation converter 510.

The noise cancellation EMI signal is synchronized, in inverse phase and of equivalent amplitude with the primary EMI signal and, as is known by the theorem of superposition, creates a resultant EMI signal which is the algebraic sum of the primary EMI signal and the noise cancellation EMI signal. In many practical implementations, the amplitude of the resultant EMI signal is substantially reduced from the amplitude of the primary EMI signal and the noise cancellation EMI signal.

Optionally, the parasitic impedances of the primary converter 500 and the noise cancellation converter 510 may be closely matched, using methods known to those with knowledge in the art, to further improve the reduction of the amplitude of the resultant EMI signal.

Optionally, the amplitude of the noise cancellation EMI signal may be adjusted to further match the amplitude of the primary EMI signal by adjusting the input voltage (Vin) of the noise cancellation converter 510 to match that of the primary converter 500 establishing a noise cancellation EMI signal at the switching node of the noise cancellation converter 510 with an amplitude matching that of the primary EMI signal at the switching node of the primary converter 500.

Figure 6:
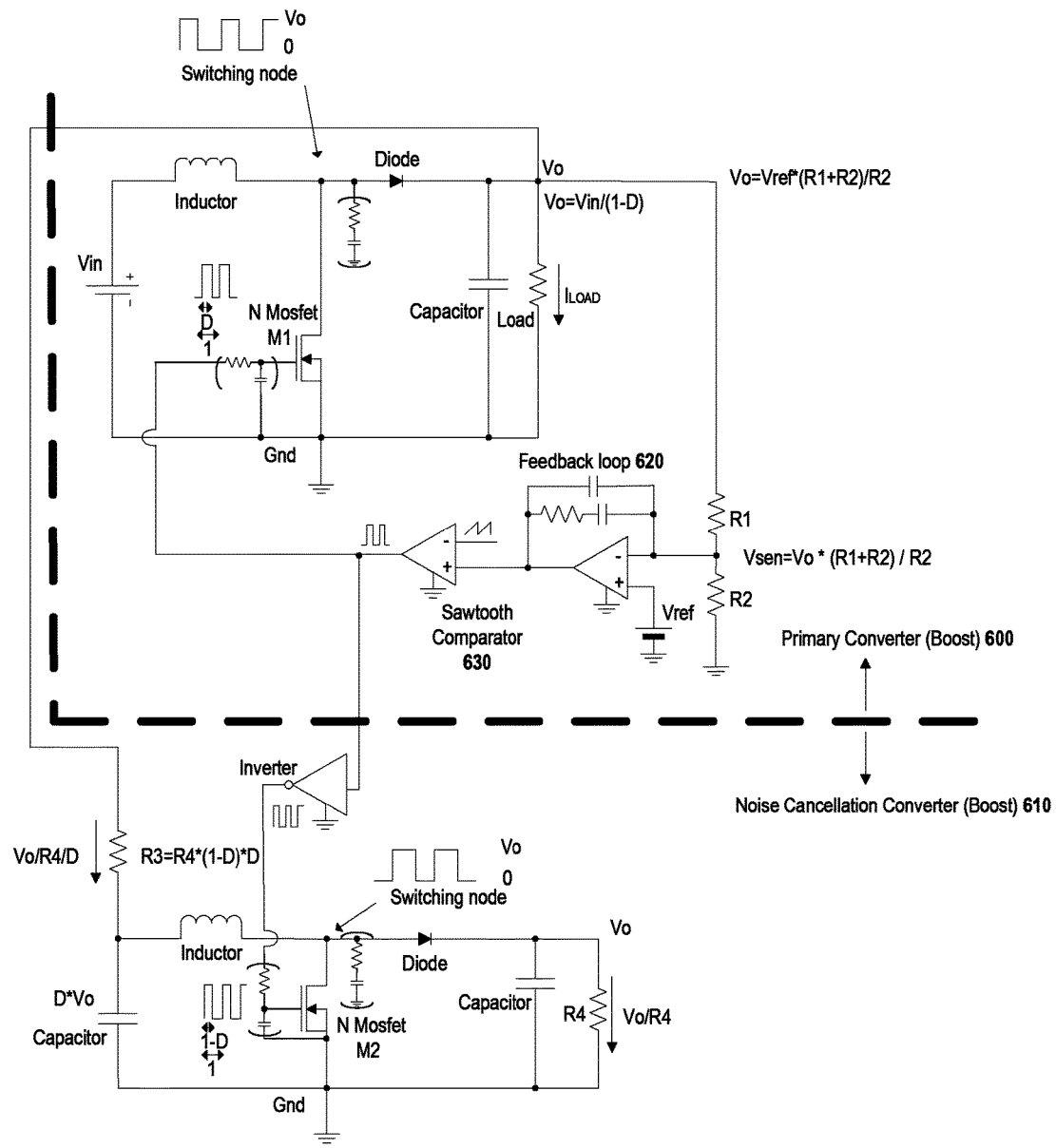
FIG. 6 illustrates a schematic of an exemplary boost topology primary converter and a boost topology noise cancellation converter, in accordance with an embodiment of the present invention.

FIG. 6 illustrates a schematic of an exemplary boost topology primary converter and a boost topology noise cancellation converter, in accordance with an embodiment of the present invention. Primary converter 600 comprises a boost converter circuit and delivers power to a load. Noise cancellation converter 610 comprises a boost converter circuit. Typically, the noise cancellation converter 610 is located in close physical proximity to the primary converter 600. Optionally, as a non-limiting example, the noise cancellation converter 610 and the primary converter 600 may be implemented on a common printed circuit assembly substrate, on a common integrated circuit substrate, or equivalent thereof.

Further, the primary converter 600 comprises a voltage feedback loop 620 circuit comprised of an opamp and an RC network. Voltage feedback loop 620 compares a sensed voltage Vsen with a reference voltage Vref and provides an input signal, which is a function of Vsen and Vref, to a sawtooth comparator 630 circuit.

Sawtooth comparator 630 compares the input signal with a sawtooth waveform and forms a pulse width modulation (PWM) signal. The PWM signal is input into an inverter circuit forming an inverted PWM signal. Optionally, the PWM signal may be level shifted, buffered, filtered or otherwise conditioned by methods known by those with knowledge in the art. The PWM signal drives the gate of the primary converter 600 MOSFET M1 and the inverted PWM signal drives the gate of the noise cancellation converter 610 MOSFET M2 synchronizing the switching operation of the primary converter 600 and the noise cancellation converter 610.

The switching operation of the primary converter 600 and the noise cancellation converter 610 are synchronized and operate in inverse phase. The switching operation of the primary converter 600 creates a primary electro-magnetic interference (EMI) signal at the switching node of the primary converter 600 and the switching operation of the noise cancellation converter 610 creates a noise cancellation EMI signal at the switching node of the noise cancellation converter 610.

The noise cancellation EMI signal is synchronized, in inverse phase and of equivalent amplitude with the primary EMI signal and, as is known by the theorem of superposition, creates a resultant EMI signal which is the algebraic sum of the primary EMI signal and the noise cancellation EMI signal. In many practical implementations, the amplitude of the resultant EMI signal is substantially reduced from the amplitude of the primary EMI signal and the noise cancellation EMI signal.

Optionally, the parasitic impedances of the primary converter 600 and the noise cancellation converter 610 may be closely matched, using methods known to those with knowledge in the art, to further improve the reduction of the amplitude of the resultant EMI signal.

Optionally, the amplitude of the noise cancellation EMI signal may be adjusted to further match the amplitude of the primary EMI signal by adjusting the output voltage (Vo) of the noise cancellation converter 610 to match that of the primary converter 600 establishing a noise cancellation EMI signal at the switching node of the noise cancellation converter 610 with an amplitude matching that of the primary EMI signal at the switching node of the primary converter 600.

Figure 7:
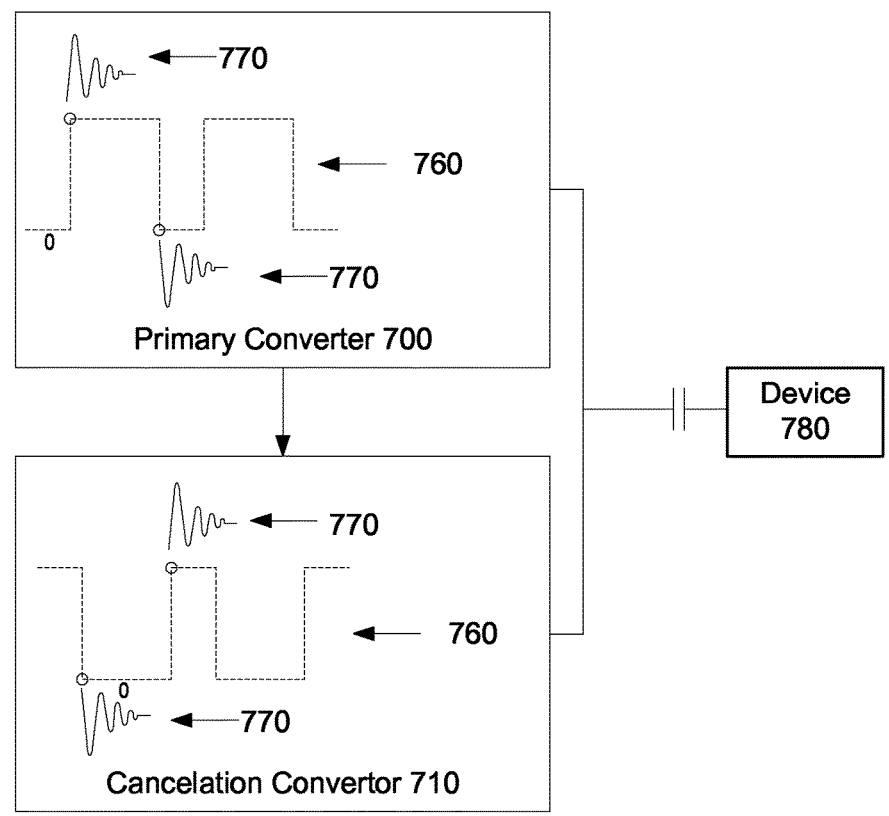
FIG. 7 illustrates a diagram of an exemplary system with a primary converter and a noise cancellation converter, in accordance with an embodiment of the present invention.

FIG. 7 illustrates a diagram of an exemplary system with a primary converter and a noise cancellation converter, in accordance with an embodiment of the present invention. Primary converter 700 is a switching regulator circuit as may be used in a switching power converter. The primary converter 700 may produce an EMI signal that includes a fundamental component 760 from the PWM component and a high frequency component 770. The noise cancellation converter operates in synchronization with the primary converter to produce an EMI signal with a phase inversion of the fundamental component 760 and high frequency component 770. The EMI signals from the primary convert 700 and the noise cancellation converter 710 may couple to device 780 where in accordance with the teaching of the present invention, the EMI signals combine and are substantially reduced or eliminated.

Figure 8:
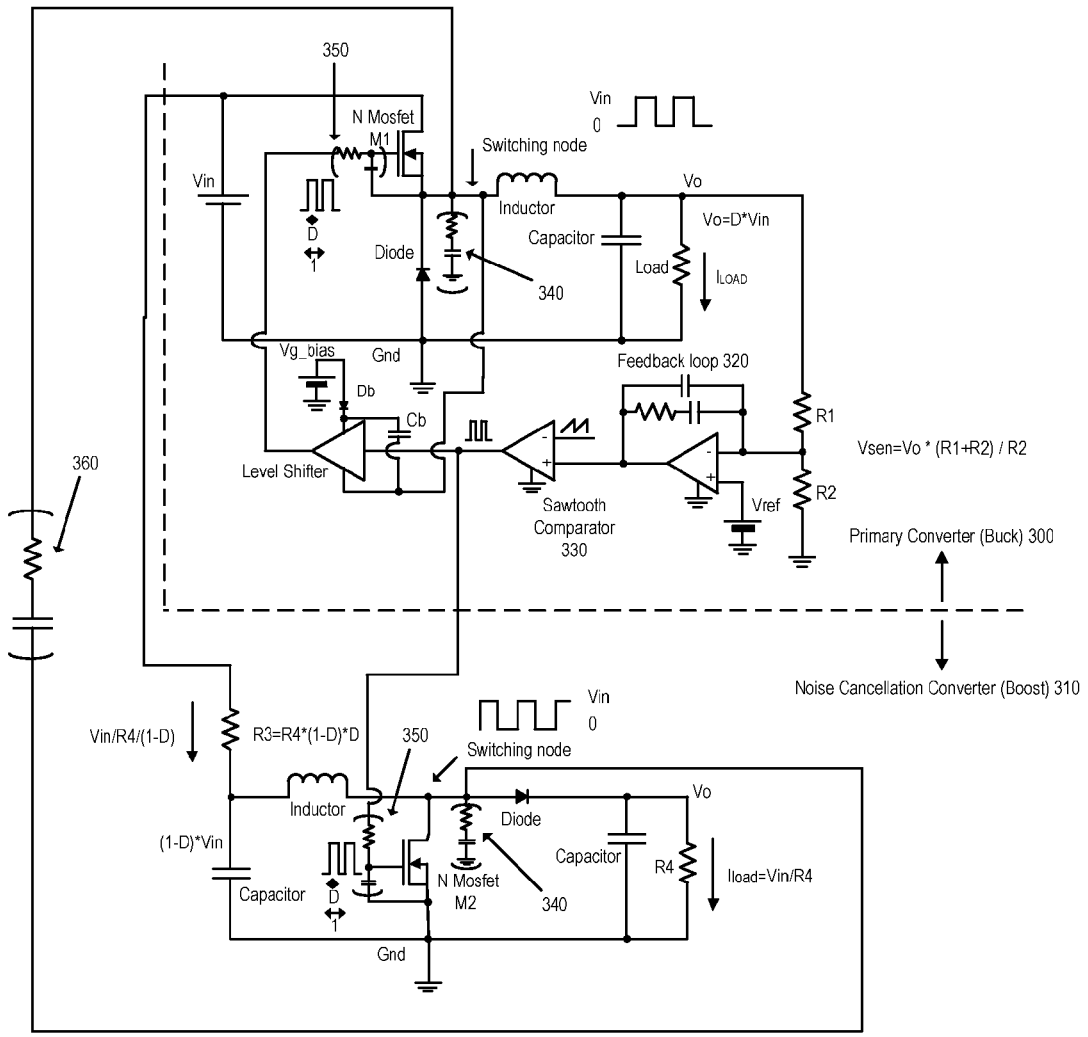
FIG. 8 illustrates a schematic of an exemplary buck or a step-down converter, in accordance with an embodiment of the present invention.

In FIG. 8, the primary converter 300 operates as a buck or a step-down converter, while the secondary converter or the noise cancellation converter 310 operates as a boost or a step-up converter. The primary converter and the secondary converter operate side by side. The secondary converter operates in synchronization with the primary converter because its gate drive is fed by the same clock (the output of the comparator 330) as that of the primary converter. As a result, the switching node of the secondary converter is in an inverse phase with that of the primary converter, since the switching node of the primary converter goes high when the FET M1 is on, while the switching node of the secondary converter goes low when the FET M2 is on. If the resistor R3 coupling the input of the primary converter and the input of the secondary converter is properly sized, as calculated in FIG. 1, the switching node pulses of the primary converter and those of the secondary converter will be equal in amplitude. In addition to this, the subject invention couples the switching node of the primary converter and that of the secondary converter with the adjustable RC network 360.

Figure 9:
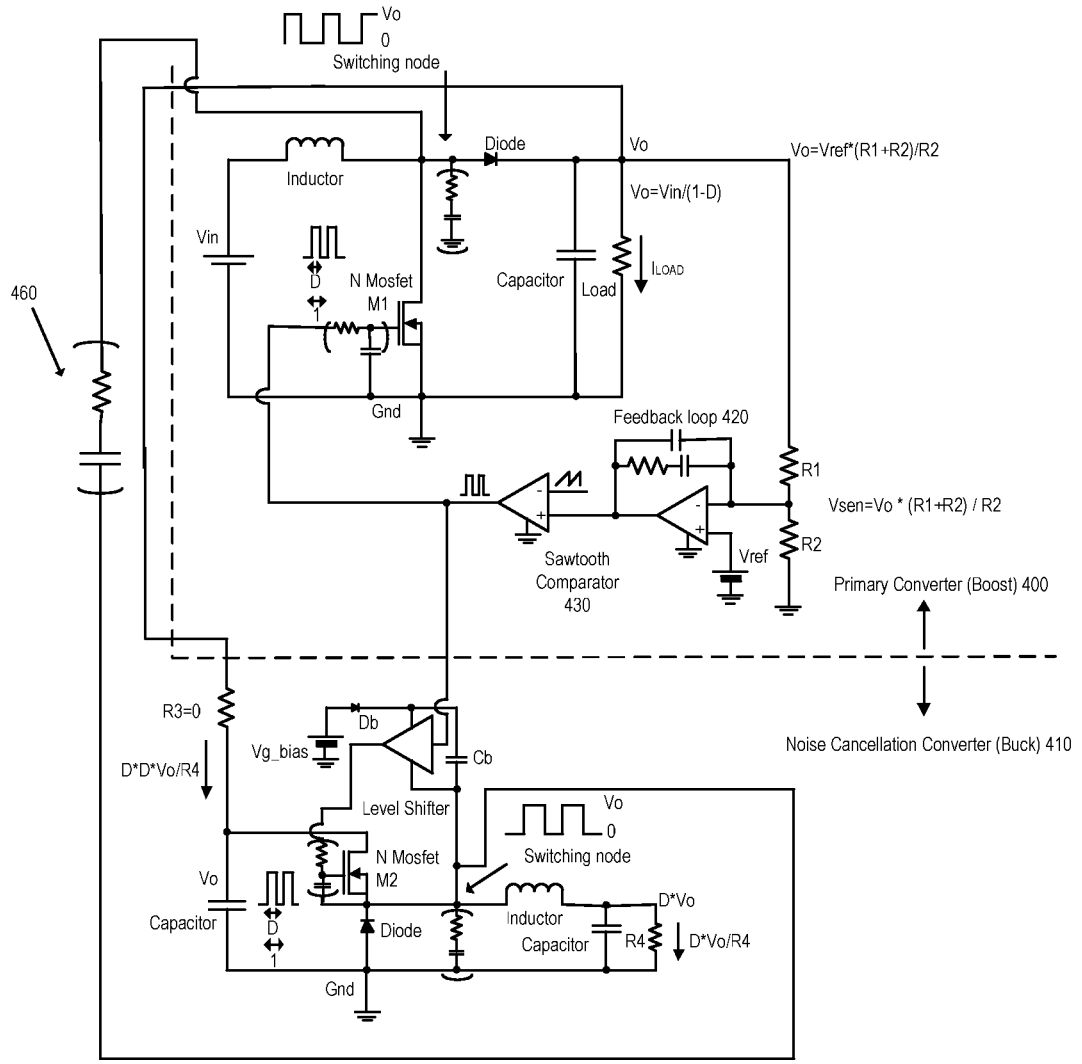
FIG. 9 illustrates a schematic of an exemplary buck or a step-up converter, in accordance with an embodiment of the present invention.

In FIG. 9, the primary converter 400 operates as a boost or a step-up converter, while the secondary converter or the noise cancellation converter 410 operates as a buck or a step-down converter. The primary converter and the secondary converter operate side by side. The secondary converter operates in synchronization with the primary converter because its gate drive is fed by the same clock (the output of the comparator 430) as that of the primary converter. The clock is then level shifted to be able to drive the FET M2 with respect to the source of the FET M2 (or the switching node of 410). As a result, the switching node of the secondary converter is in an inverse phase with that of the primary converter, since the switching node of the primary converter goes low when the FET M1 is on, while the switching node of the secondary converter goes high when the FET M2 is on. If the resistor R3 coupling the output of the primary converter and the input of the secondary converter is 0 ohm, the switching node pulses of the primary converter and those of the secondary converter will be equal in amplitude. In addition to this, the subject invention couples the switching node of the primary converter and that of the secondary converter with the adjustable RC network 460.

Figure 10:
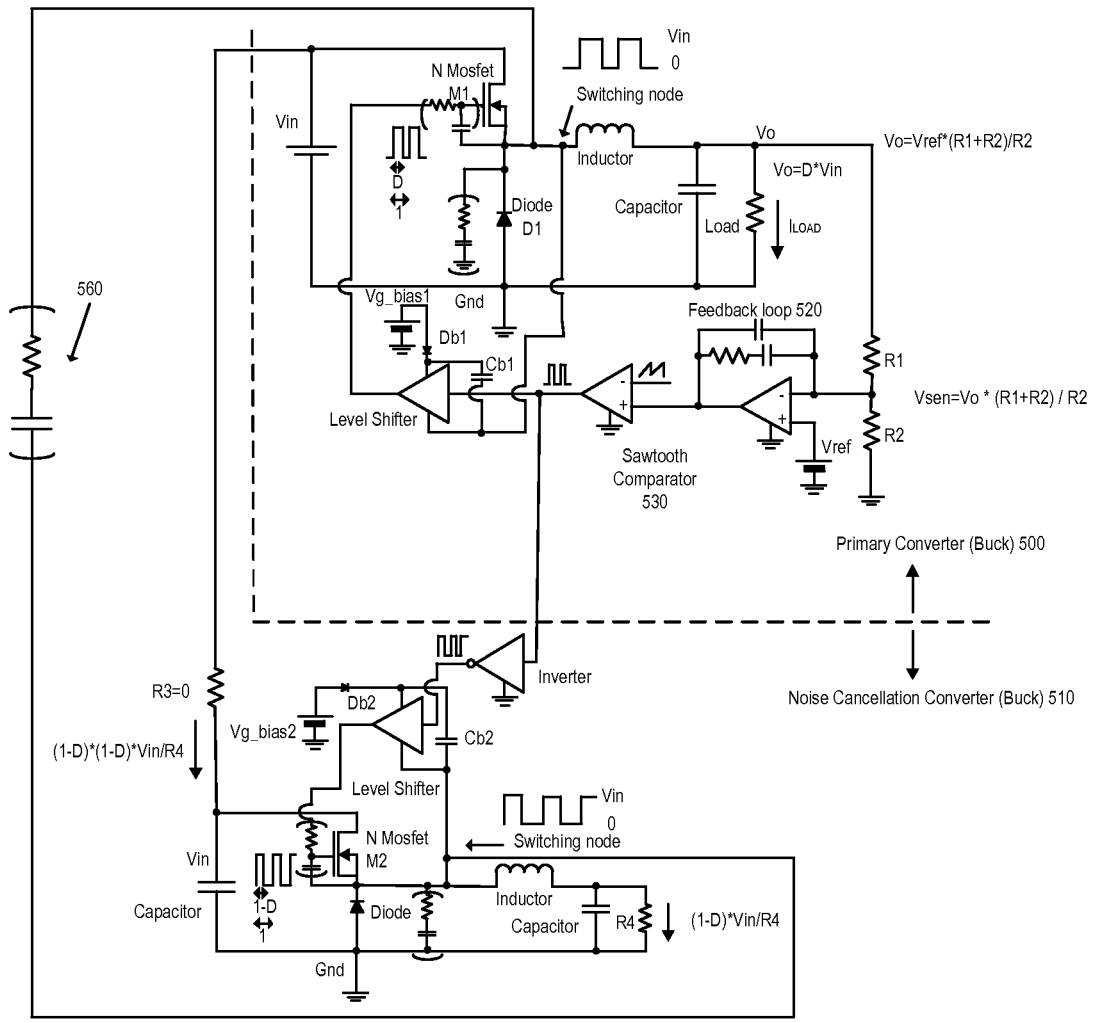
FIG. 10 illustrates a schematic of an exemplary buck or a step-up converter, in accordance with an embodiment of the present invention.

In FIG. 10, the primary converter 500 operates as a buck or a step-down converter, and the secondary converter or the noise cancellation converter 510 operates as a buck or a step-down converter as well. The primary converter and the secondary converter operate side by side. The secondary converter operates in synchronization with the primary converter because its gate drive is fed by the same clock (the output of the comparator 530) as that of the primary converter. The clock is inverted in phase and then level shifted to be able to drive the FET M2 with respect to the source of the FET M2. As a result, the switching node of the secondary converter is in an inverse phase with that of the primary converter, since the switching node of the primary converter goes high when the FET M1 is on, while the switching node of the secondary converter goes low when the FET M2 is off. If the resistor R3 coupling the input of the primary converter and the input of the secondary converter is 0 ohm, the switching node pulses of the primary converter and those of the secondary converter will be equal in amplitude. In addition to this, the subject invention couples the switching node of the primary converter and that of the secondary converter with the adjustable adjustable RC network 560.

Figure 11:
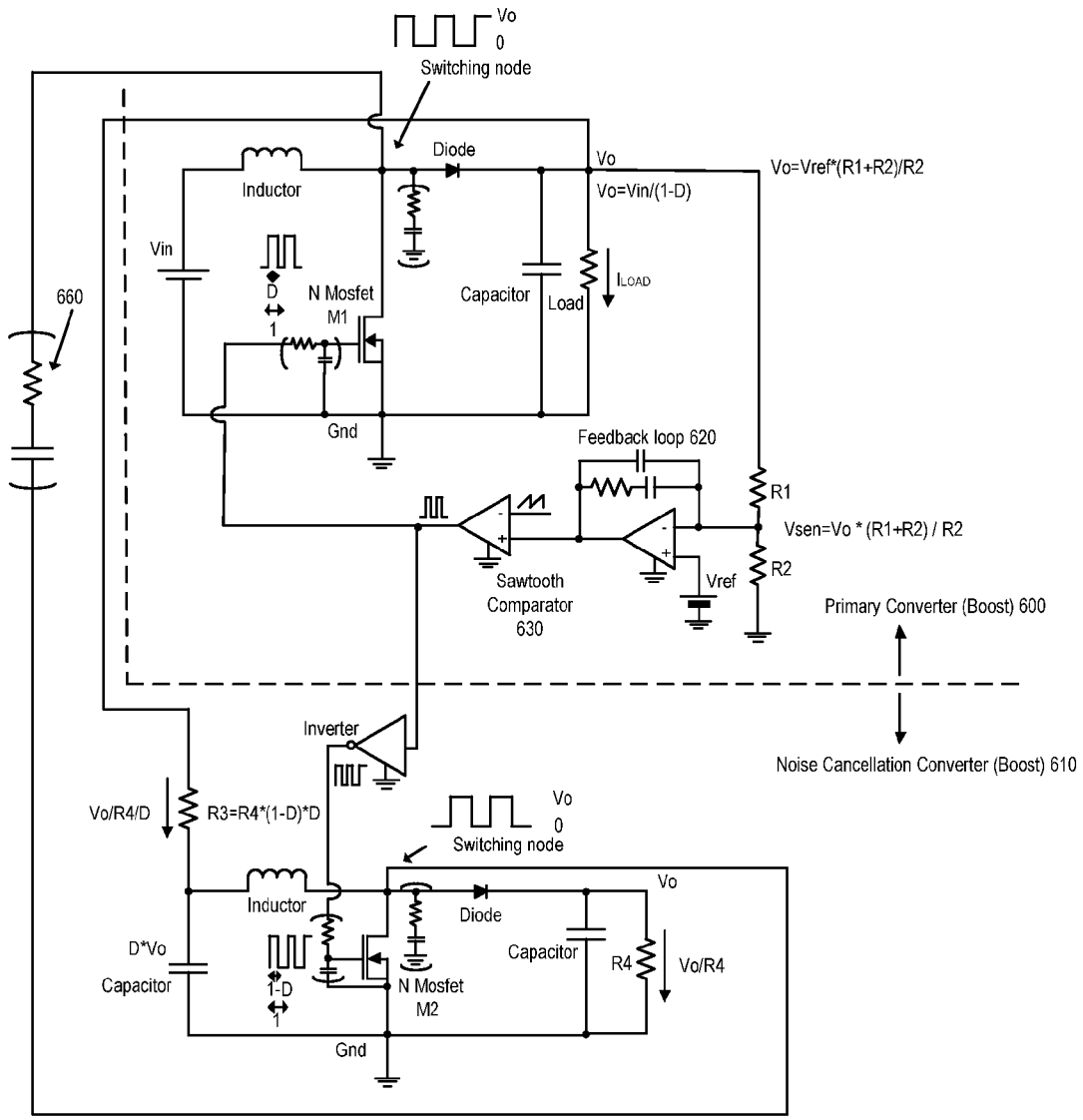
FIG. 11 illustrates a schematic of an exemplary buck or a step-up converter, in accordance with an embodiment of the present invention.

In FIG. 11, the primary converter 600 operates as a buck or a step-down converter, and the secondary converter or the noise cancellation converter 610 operates as a buck or a step-down converter as well. The primary converter and the secondary converter operate side by side. The secondary converter operates in synchronization with the primary converter because its gate drive is fed by the same clock (the output of the comparator 530) as that of the primary converter. The clock is inverted in phase and then level shifted to be able to drive the FET M2 with respect to the source of the FET M2. As a result, the switching node of the secondary converter is in an inverse phase with that of the primary converter, since the switching node of the primary converter goes high when the FET M1 is on, while the switching node of the secondary converter goes low when the FET M2 is off. If the resistor R3 coupling the input of the primary converter and the input of the secondary converter is 0 ohm, the switching node pulses of the primary converter and those of the secondary converter will be equal in amplitude. In addition to this, the subject invention couples the switching node of the primary converter and that of the secondary converter with the adjustable RC network 660.

In the previous invention, the RC network was absent. So the electro-magnetic interference signal of the primary converter and that of the secondary converter together create the algebraic sum by traveling in the air or in the common substrate. The RC network coupling the switching node of the primary converter and that of the secondary converter creates much more direct algebraic summing effect than the parasitic capacitance in the air or the common substrate does.

Figure 12:
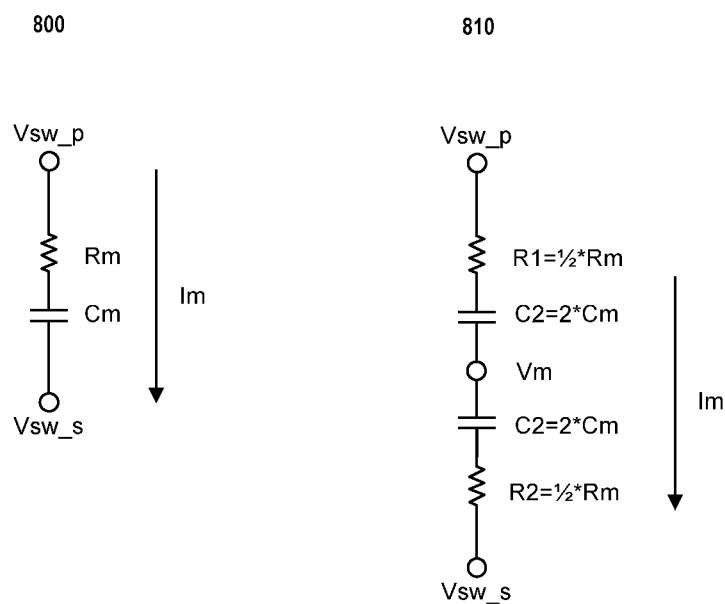
FIG. 12 shows an RC network component, in accordance with an embodiment of the present invention.

FIG. 12 shows the RC network 800 configured to couple the first switching node and the secondary switching node. The RC network consists of the resistor Rm and the capacitor Cm. If the eq. 1 and the eq. 2 are satisfied, the RC network 800 becomes equivalent to the RC network 810. The point Vm is the artificial midpoint of the two switching nodes.

$$R_1 = R_2 = \tfrac{1}{2} R_m \qquad \text{eq. (1)}$$

$$C_1 = C_2 = 2 C_m \qquad \text{eq. (2)}$$

Since Vm sees the equal impedance from itself to both Vsw_p and Vsw_s, Vm is the arithmetic average voltage of Vsw_p and Vsw_s.

$$V_m = \tfrac{1}{2}(V_{sw\_p} + V_{sw\_s}) \qquad \text{eq. (3)}$$

The current going from the primary switching node to the secondary switching node is Im. Therefore, the primary switching node voltage Vsw_p is calculated to be, $$V_{sw_p} = V_m + \left(R_1 + \frac{1}{C_1 * s}\right) I_m, \qquad \text{eq. (4)}$$

where s is s-plane impedance. Plugging in eq. (3) into eq. (4) gives, $$V_{sw_p} = \frac{1}{2}(V_{sw\_p} + V_{sw\_s}) + (R_1 C_1 s + 1)\frac{I_m}{C_1 s}. \qquad \text{eq. (5)}$$

The corner frequency of eq. (5) is $$\frac{1}{2\pi R_1 c_1} \text{ or } \frac{1}{2\pi R_m c_m}.$$

Therefore, above the corner frequency, eq. (5) approaches eq. (6).
If $$f > \frac{1}{2\pi R_m c_m},$$

then, $$V_{sw_p} \approx \frac{1}{2}(V_{sw\_p} + V_{sw\_s}) + R_1 I_m. \qquad \text{eq. (6)}$$

If R1 or Rm approaches 0, then eq. (6) approaches eq. (7). If $R_1 \rightarrow 0$ or $R_m \rightarrow 0$, then $$V_{sw\_p} \approx \frac{1}{2}(V_{sw\_p} + V_{sw\_n}) \qquad \text{eq. (7)}$$

Then $$V_{sw\_p} \approx V_{sw\_s} \qquad \text{eq. (8)}$$

If the high frequency component (770 in FIG. 13) of the electro-magnetic interference signal of the primary converter and that (770 in FIG. 13) of the secondary converter are equal in amplitude, frequency and in an inverse phase, then Vsw_p and Vsw_n should be equal in amplitude and in inverse phase with each other as well. Thus, $$V_{sw\_p} \approx -V_{sw\_s} \qquad \text{eq. (9)}$$

Plugging in the eq. (9) into the eq. (8) gives the following, $$V_{sw\_p} \approx V_{sw\_s} \approx 0 \qquad \text{eq. (10)}$$

Eq. (10) suggests that if Rm and Cm are properly selected and the high frequency component (770 in FIG. 13) of the electro-magnetic interference signal of the primary converter and that (770 in FIG. 6) of the secondary converter are matched in amplitude, frequency and in an inverse phase, the high frequency f>

$$f > \frac{1}{2\pi R_m c_m}$$

electro-magnetic interference signals emitted by the two switching nodes are cancelled or substantially reduced. How to match the high frequency component of the electromagnetic interference signal of the primary converter and that of the secondary converter in amplitude and frequency is explained in detail in the previous invention.

It should be understood that those skilled in the art, in light of the teachings of the present application, will readily recognize how to adapt the foregoing EMI cancellation teachings to any suitable alternative switch mode regulator topologies depending upon the needs of the particular application. By way of example, and not limitation, the foregoing embodiments were exemplified using passive free-wheeling diode designs, however, it is well know that the free-wheeling diode may be replaced with an anti-phase switched MOSFET device to create a more efficient active push-pull switching regulator design and still work according to similar EMI cancellation principles as taught in the foregoing.

Figure 13:
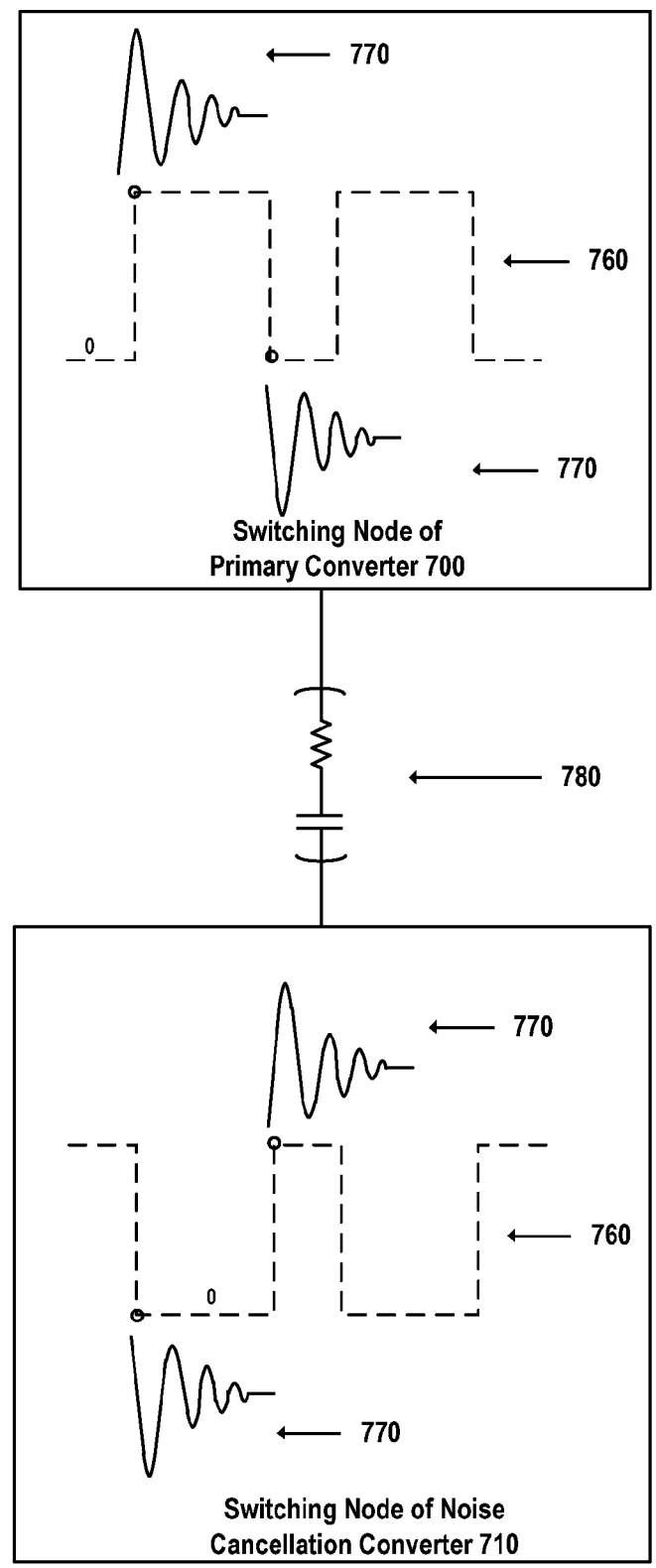
FIG. 13 illustrates a diagram of an exemplary system with an RC network component coupling or connecting a switching node of a primary converter to a switching node of a noise cancellation converter, in accordance with an embodiment of the present invention.

FIG. 13 illustrates a diagram of the RC network component coupling or connecting the switching node of a primary converter to the switching node of a noise cancellation converter.

In some embodiments, if the free-wheeling diode is replaced with an active MOSFET, the parasitic capacitance between the drain and the source contributes to the ringing or the EMI signal/noise. Furthermore the active MOSFET is not turned on when the primary switching MOSFET transitions from on-state to off-state, or from off-state to on-state, because of the dead time insertion or anti-shoot-through (cross-conduction) scheme. It is turned on only after the dead time expires or turned off before the dead time initiates. For these reasons, the calculation of the EMI frequency is conducted in the same manner in both asynchronous converters and synchronous converters. In case of a push-pull converter, it is customary to use the same type of devices for primary switching FETs, and another same type of devices for free-wheeling diodes or synchronous FETs. Thus, controlling the mismatch (within 10% tolerance) is achievable.

The present invention encapsulates any set of switching converters which are coupled in timings of both turn-on and turn-off, and of which phase nodes alternate in inverse relation to each other. The present invention includes, but is not limited to, MOSFET, BJT, IGBT, thyristers, synchronous topology, asynchronous topology, buck topology, boost topology, buck-boost topology, Cuk topology, SEPIC topology, isolated topology, and non-isolated topology. This invention may include converters which operate in the discontinuous mode.

In some embodiments, the load current levels of the primary converter and the noise cancellation converter may match to provide the best noise cancellation effect. However the drawback is that the noise cancellation converter dissipates as much power as the primary converter does just to provide the counter EMI signal. The primary converter delivers current to an ASIC or any electrical load on the PCB assembly substrate, but the noise cancellation converter typically does not, since it operates in open-loop control and its voltage is not regulated. However, in some embodiments, depending on the voltage level, there may be a use for this voltage, such as, but not limited to, an input voltage to a battery charger, or an intermediate bus voltage if the system is configured to permit such usages. If the primary converter is loaded by an ASIC or any other electric load, thereby operating in the continuous conduction mode, and emitting the EMI noise/signal to such an extent that the EMI noise gets coupled into differential signal pairs of ASICs on the same assembly substrate, the noise cancellation converter may operate in the continuous conduction mode. Yet its current level doesn't have to match that of the primary converter. In some embodiments, when the noise cancellation converter operates in the continuous conduction mode, the inductor value of the noise cancellation converter may be large to suppress the peak to peak inductor ripple current as low as possible for the noise cancellation converter to stay in the continuous conduction mode with relatively small load current on its output.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of implementing methods of cancellation of electro-magnetic noise according to the present invention will be apparent to those skilled in the art. Various aspects of the invention have been described above by way of illustration, and the specific embodiments disclosed are not intended to limit the invention to the particular forms disclosed. The particular implementation of methods of cancellation of electro-magnetic noise may vary depending upon the particular context or application. By way of example, and not limitation, the methods of cancellation of electro-magnetic noise described in the foregoing were principally directed to switching regulator implementations; however, similar techniques may instead be applied to digital clock generator circuits or digital logic circuits, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system comprising:
    a primary converter device, the primary converter device being operable to supply power to at least one load device, the primary converter device comprising;
        a primary switching regulator component, said primary switching regulator component being configured to at least switch states between on and off; and
        a primary switching node component, wherein the switching operation of the primary switching regulator component is configured to at least create a primary electro-magnetic interference signal at the primary switching node component;
    a noise cancellation converter device, the noise cancellation converter device being configured for phase inverted synchronous operation with said primary converter device, the noise cancellation converter device comprising;
        a secondary switching regulator component, said secondary switching regulator component being configured to at least switch states between on and off; and
        a secondary switching node component, wherein the switching operation of the secondary switching regulator component creates a noise cancellation electromagnetic interference signal at the secondary switching node component, the noise cancellation electromagnetic interference signal are synchronized and operate in inverse phase with said primary electromagnetic interference signal, thereby, creating a resultant electro-magnetic interference signal, and wherein said resultant electro-magnetic interference signal having a substantially reduced amplitude; and
    an RC network component, said RC network component being configured to operatively connect at least the primary converter device and the noise cancellation converter device, said RC network component being operable to cancel out the resultant electro-magnetic interference signal.

2. The apparatus as recited in claim 1, in which said RC network component comprises at least a resistor and a capacitor connected in series.

3. The apparatus as recited in claim 1, in which said noise cancellation converter device is configured to at least operate as a boost or a step-up converter device and the primary converter device is configured to at least operate as a buck or a step-down converter device.

4. The apparatus as recited in claim 1, in which at least one or both of said noise cancellation converter device and said primary converter device further comprises at least a snubber device being operable for adjustment of at least one of the primary electromagnetic interference signal and the noise cancellation electromagnetic interference signal.

5. The apparatus as recited in claim 1, in which said noise cancellation converter device further comprises at least a passive circuit coupled to a control gate circuit for adjustment of the noise cancellation electromagnetic interference signal.

6. The apparatus as recited in claim 1, in which said noise cancellation converter device further comprising at least an open loop mode noise cancellation converter device being operable for providing at least one of an input voltage to a battery charger and an intermediate bus voltage.

7. The apparatus as recited in claim 1, further comprising a common substrate, said common substrate comprising at least one of a common printed circuit assembly substrate and a common integrated circuit substrate shared by said noise cancellation converter device and the primary converter device operating in a side by side topology.

8. The apparatus as recited in claim 1, in which said primary converter device is configured to at least operate as a boost or a step-up converter device and said noise cancellation converter device is configured to at least operate as a buck or a step-down converter circuit.

9. A system comprising:
    a primary converter, said primary converter being operable to supply power to at least one load device, said primary converter comprising;
        a primary switching regulator, said switching regulator being configured to switch states between on and off; and
        a primary switching node, wherein the switching operation of the primary switching regulator being operable to create a primary electro-magnetic interference signal at the primary switching node;

a noise cancellation converter being configured for phase inverted synchronous operation with respect to said primary converter, said noise cancellation converter further being configured with parasitic components substantially matching parasitic components of the primary converter, said noise cancellation power converter comprising;
   a secondary switching regulator, said switching regulator being configured to switch states between on and off in said phase inverted synchronous operation with said first switching regulator, wherein the phase of said primary converter is an inverse of the phase of the noise cancellation converter; and
   a secondary switching node, wherein the switching operation of the secondary switching regulator circuit creates a noise cancellation electro-magnetic interference signal at the secondary switching node, the noise cancellation electro-magnetic interference signal are synchronized and operate in inverse phase with said primary electro-magnetic interference signal, thereby, creating a resultant electro-magnetic interference signal, which is an algebraic sum of the primary electro-magnetic interference signal and the noise cancellation electro-magnetic interference signal, and wherein said resultant electro-magnetic interference signal having a substantially reduced amplitude; and
an RC network component, said RC network component being configured to operatively connect the primary converter and the noise cancellation converter, said RC network component being operable to cancel out the resultant electro-magnetic interference signal.

\* \* \* \* \*